United States Patent [19]

Brügelmeir, Jr.

[11] Patent Number: 4,945,645

[45] Date of Patent: Aug. 7, 1990

[54] COMBINED CAR WASH AND WHEEL ALIGNMENT MEASURING DEVICE

[75] Inventor: Egon Brügelmeir, Jr., Buxheim, Fed. Rep. of Germany

[73] Assignee: Volker Remy, Montreal, Canada

[21] Appl. No.: 218,939

[22] Filed: Jul. 14, 1988

[30] Foreign Application Priority Data

Apr. 2, 1988 [DE] Fed. Rep. of Germany ....... 8804443

[51] Int. Cl.⁵ .............................................. G01B 5/255
[52] U.S. Cl. ................................... 33/203.14; 33/203; 33/203.12
[58] Field of Search ................ 33/203, 203.12–203.21; 15/DIG. 2, 53 R, 53 A, 53 AB, 53 B; 134/123, 115 R

[56] References Cited

U.S. PATENT DOCUMENTS

| | | | |
|---|---|---|---|
| 1,864,944 | 6/1932 | Rosebrook | 15/DIG. 2 |
| 3,309,776 | 3/1967 | Papazian | 33/203.14 |
| 3,905,120 | 9/1975 | Butler | 33/203.14 |
| 4,643,209 | 2/1987 | Fast | 134/123 |

Primary Examiner—William A. Cuchlinski, Jr.
Assistant Examiner—Patrick R. Scanlon
Attorney, Agent, or Firm—Fleit, Jacobson, Cohn, Price, Holman & Stern

[57] ABSTRACT

A car wash includes a roller-conveyor belt for driving a car through the car wash. A front wheel alignment device measures the alignment of the front wheels of the car after the car has been driven through the car wash. The measuring device is positioned at the end of the roller-conveyor belt so that the front wheels of the car are moved across the measuring device by the conveyor belt. A measurement of the wheel alignment is then displayed to the driver from a console located adjacent to the measuring device.

5 Claims, 1 Drawing Sheet

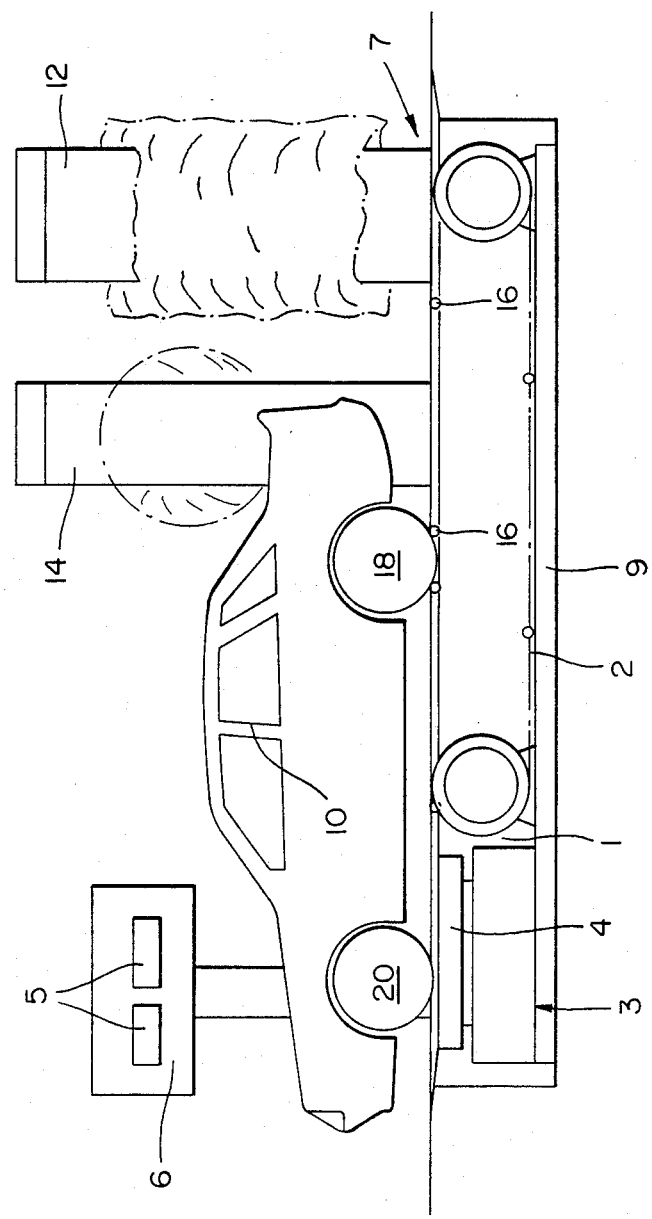

COMBINED CAR WASH AND WHEEL ALIGNMENT MEASURING DEVICE

FIELD OF THE INVENTION

The invention is directed to a car washing unit which includes a washing device having a roller-conveyor belt and a wheel alignment measuring device.

BACKGROUND OF THE INVENTION

Car washing units are frequently found at service or filling stations, automobile repair shops, and similar businesses. Such units generally consist of washing devices through which a car is guided by means of a roller-conveyor belt. The washing devices are entirely automated, e.g., by inserting a card or coin into a control switch member, which automatically initiates the car washing process.

Devices for measuring wheel alignment are also known. Typically, such alignment measuring devices are installed in filling stations, automobile repair shops, and similar businesses. A representative alignment measuring device or wheel alignment scuff gauge is manufactured by MASCHINEN BAU, HALDENWANG GmbH & Co. KG, 896, Haldenwaug, Hoyen 2, WEST GERMANY.

Normally, a wheel alignment scuff gauge is used to measure wheel alignment by pulling or pushing a car over plates in the floor of the measuring installation. This is necessary, since any abnormal movement by the wheels of a car over the measuring device plates results in a false wheel alignment measurement. However, such methods are time-consuming and complicated. Not only is it expensive to install a roller-conveyor belt in the floor of a test facility or auto repair garage for pushing a car over the plates, it also requires significantly more floor space to be occupied by the roller-conveyor belt.

In most repair shops, room for such a measuring section is not available. Consequently, wheel alignment measurement by wheel alignment scuff gauges is a service performed by few repair shops. Moreover, when wheel alignment measuring equipment is available, a car must still be pushed over the plates of a scuff gauge wheel alignment measuring device.

SUMMARY OF THE INVENTION

The present invention is designed to overcome the above-noted problems by providing a wheel alignment scuff gauge for measuring automobile wheel alignment which greatly facilitates its operation and enhances opportunities for its use. The invention comprises a car wash installation and includes a wheel alignment scuff gauge mounted at the end of the roller-conveyor belt of the car wash.

According to the invention, a car wash having an existing conveying device, such as a roller-conveyor belt, is combined with a wheel alignment scuff gauge in such a way that the roller-conveyor belt pushes the car over the plates of the wheel alignment scuff gauge. Also, it would be a relatively simple task to insert the wheel alignment scuff gauge of the present invention at an already existing car wash. Nor would water from the car wash pose a problem, since the wheel alignment scuff gauge measuring device is sufficiently protected from water and/or is moisture-proof. As an added benefit, more customers would be inclined to patronize the business, since the wheel alignment measuring service would form part of the regular process of having a car washed.

Depending on facility requirements and the availability of space at the car wash, one or two testing plates may be mounted at the end of the roller-conveyor belt. When two plates are used, one testing plate is located immediately after each guide track of the car and in the path of the wheels.

In accordance with a preferred embodiment of the invention, testing plates of a wheel alignment scuff gauge are connected to a visual display of a wheel alignment measurement and/or print-out device, by which the driver of the vehicle immediately receives the results of the wheel alignment measurement upon leaving the car wash. This information is transmitted to the driver of a car e.g., by means of a visual message from a display console located adjacent to the path of travel of a car through the car wash and/or a written record of the wheel alignment measurement by means of a print-out device.

For ease of operation, the display console is preferably mounted at the side of the testing plate(s). In this way, a driver need not get out of the car in order to find the wheel alignment results.

BRIEF DESCRIPTION OF THE DRAWING

FIG. 1 is a schematic example of the embodiment of the invention showing a lateral, in-part sectional view.

DETAILED DESCRIPTION OF THE PREFERRED EMBODIMENT

A know car wash installation 7 including a continuous roller-conveyor belt 2, a washing area 12, and a drying area 14 are mounted in a frame 9. The belt 2 includes a plurality of rollers 16 which engage the rear wheels 18 of an automobile 10 to drive the automobile through the car wash 7.

A known wheel alignment scuff gauge measuring device 3, as manufactured by the German company previously mentioned, is placed directly downstream from the end 1 of the roller-conveyor belt 2. The measuring device 3 includes at least one and preferably two testing plates 4 and a display console 6.

After the automobile 10 has passed through the car wash 7, it is driven by means of the roller-conveyor belt 2 over the testing plate(s) 4 so that the wheel alignment of the front wheel(s) 20 are measured. Immediately after the measurement of the wheel alignment, the results appear on the visual display and print-out windows 5 in the console 6.

The console 6 is placed close to the side of the test plate(s) 4, near the exit from the car wash 7. The height of the console is preferably such that the driver can reach it from the open car window. If the design of the car wash 7 should make this necessary, the console 6 may be mounted outside the washing installation.

I claim:

1. A car washing and wheel alignment unit comprising:
    a car wash having a washing area and a drying area,
    a roller-conveyor belt extending through said car wash and terminating downstream from said drying area for driving a car through said car wash by pushing the rear wheels of the car through the car wash, and
    measuring means for measuring of the alignment of the front wheels of the car after the car has been driven through said car wash by pushing of the rear wheels of the car by said roller-conveyor belt, said measuring means being located downstream from said car wash in a path of travel of a car being driven through said car wash by said roller-conveyor belt and said measuring means being spaced from a terminal end of said roller-conveyor belt so that the front wheels of the car are moved across said measuring means by said roller-conveyor belt simultaneously pushing the rear wheels of the car as said roller-conveyor belt discharges a car from said car wash and the car continues along said path of travel beyond said measuring means.

2. A car washing and wheel alignment unit in accordance with claim 1, further comprising at least one testing plate of said measuring means positioned beyond said terminal end of said belt.

3. A car washing and wheel alignment unit in accordance with claim 1, further comprising a testing plate of said measuring means connected with a display and print-out device.

4. A car washing and wheel alignment unit in accordance with claim 3, wherein said display and print-out device is mounted in a console.

5. A car washing and wheel alignment unit in accordance with claim 4 wherein said console is mounted at a side of said measuring means.

* * * * *